(12) United States Patent
Ebert et al.

(10) Patent No.: US 12,066,311 B2
(45) Date of Patent: Aug. 20, 2024

(54) FLOW RATE SENSOR SYSTEM, METHOD FOR AND USE OF SUCH SYSTEM FOR DETERMINING A FLOW RATE

(71) Applicant: Roche Molecular Systems, Inc., Pleasanton, CA (US)

(72) Inventors: Sven Ebert, Zürich (CH); Michal Karol Dobrzynski, Lenzburg (CH); Paul Federer, Wolhusen (CH); Arnulf Staib, Heppenheim (DE); Lukas Schneider, Muri (CH)

(73) Assignee: Roche Molecular Systems, Inc, Pleasanton, CA (US)

( * ) Notice: Subject to any disclaimer, the term of this patent is extended or adjusted under 35 U.S.C. 154(b) by 164 days.

(21) Appl. No.: 17/456,946

(22) Filed: Nov. 30, 2021

(65) Prior Publication Data
US 2022/0170769 A1     Jun. 2, 2022

(30) Foreign Application Priority Data

Nov. 30, 2020   (EP) .................................. 20210683

(51) Int. Cl.
*G01F 1/58*     (2006.01)
*G01F 1/64*     (2006.01)

(52) U.S. Cl.
CPC ................ *G01F 1/584* (2013.01); *G01F 1/58* (2013.01); *G01F 1/64* (2013.01)

(58) Field of Classification Search
CPC .............. G01F 1/58; G01F 1/584; G01F 1/64
See application file for complete search history.

(56) References Cited

U.S. PATENT DOCUMENTS

| 4,484,479 A | 11/1984 | Eckhardt |
| 4,694,702 A * | 9/1987 | Amemori ............. G01F 1/3259 73/861.24 |

(Continued)

FOREIGN PATENT DOCUMENTS

| WO | 2014048911 A1 | 4/2014 |
| WO | 2019171376 A1 | 9/2019 |

OTHER PUBLICATIONS

Chiang, et al_ A Semicylindrical Capacitive Sensor with Interface Circuit Used for Flow Rate Measurement IEEE Sensors Journal_ 2016_vol. 6, No. 6.

(Continued)

*Primary Examiner* — Peter J Macchiarolo
*Assistant Examiner* — John M Royston
(74) *Attorney, Agent, or Firm* — Maneesh Gupta (57) ABSTRACT

The present disclosure provides for a sensor system for determining a flow rate of a fluid flow within a fluid channel comprising an elastic segment arranged next to a rigid segment, wherein a first pair of electrodes is provided at the rigid segment and a second pair of electrodes is provided at the elastic segment of the fluid channel. The system further comprises a sensor unit for detecting a capacitance of the first and second electrode pairs, and a processing unit for calculating and monitoring a distance between the electrodes of the second electrode pair based on the detected capacitance of the first electrode pair and the second electrode pair, wherein the first electrode pair is in contact with the rigid segment and the second electrode pair is in contact with the elastic segment. Moreover, a respective method for determining a flow rate of a fluid flow within a fluid channel is provided by the present disclosure, as well as a use of the sensor system.

13 Claims, 4 Drawing Sheets

(56) References Cited

U.S. PATENT DOCUMENTS

2015/0198494 A1* 7/2015 Koltay .................... G01L 9/003
                                                              73/724
2019/0285446 A1* 9/2019 Momose .................. G01F 1/60

OTHER PUBLICATIONS

Extended European Search Report, Issued May 28, 2021. European Application No. 20210683.7 filed Nov. 30, 2020.

* cited by examiner

Fig. 4

FLOW RATE SENSOR SYSTEM, METHOD FOR AND USE OF SUCH SYSTEM FOR DETERMINING A FLOW RATE

CROSS-REFERENCE TO RELATED APPLICATION

This application claims the benefit and priority of European Application Serial No. 20210683.7, filed Nov. 30, 2020, the contents of which are incorporated herein by reference for all purposes.

TECHNICAL FIELD

Generally, the present disclosure relates to the technical field of sensing fluid movement in a flexible fluid channel, and in particular to determining a flow rate in such a fluid channel based on an expansion of the fluid channel.

In particular, the present disclosure is directed to a flow rate sensor system for sensing or detecting the movement of a fluid in a fluid channel, and in more detail to a system for determining a flow rate of the fluid in the fluid channel, wherein capacitive expansion measurement is carried out in order to measure a respective capacitance change due to expansion of the fluid channel and, based thereon, determine a fluid flow rate in the fluid channel. The present disclosure is further directed to a respective method for determining the flow rate of a fluid flow within the fluid channel by means of such a system, and to the use of such a system for determining the fluid flow rate in the fluid channel.

BACKGROUND

In the medical, pharmaceutical or chemical field, it is usually required to be able to measure any kind of property of a fluid flow within a fluid carrying vessel. Often, already small amounts of liquid or gas must be transported, metered or dispensed in the course of different kinds of applications, such as drug delivery in medical applications, or metering and dispensing of fluids for industrial manufacturing. Most of these applications require a close monitoring of flow conditions of the transported fluid inside the transport channel, such as fluid flow velocity or fluid pressure, for precise dosage, quality control or general process monitoring. Here, as state of the art, pressure sensors and/or flow sensors are generally used, which sensors have to be in direct contact with the fluid to be measured. These known sensors, however, are often rather expensive due to the required features, such as self-containment and long-term stability, since these sensors usually have to be cleaned and re-used, which is costly and time-consuming or even prohibitive, e.g. for medical applications. In general, these sensors are mainly based on piezoresistive or thermal transduction mechanisms and are generally manufactured by e.g. MEMS principles. Thus, they are usually not applicable for non-contact measuring at low velocities and/or low pressure. Accordingly, there is the general need for disposable pressure or flow sensors with high sensitivity, which can be used in the course of non-contact measuring.

As an example of a known approach to find a solution for the above mentioned need, U.S. Pat. No. 4,484,479 A describes a gas flow metering method and system using capacitance measurement and comprising a taut elastomeric membrane, e.g. tubular in form, which expands or contracts as a function of a flow rate past it to an extent determined by Bernoulli's principle. Accordingly, U.S. Pat. No. 4,484,479 A discloses a gas flow sensor system in which a distance change between a pair of electrodes and a conductive membrane is proportional to a change of pressure of a flowing gas, wherein the distance change is measured based on a capacitive principle. This solution, however, lacs a scaling element necessary for providing absolute measurement values. In case of trying to derive absolute measurements, individual characterization of every sensor must be performed. Moreover, the use of a conductive membrane in direct contact with the fluid flow can often lead to static charging of the membrane and, thus, to undesired alternation of the measured capacitance. Here, in extreme cases, electrical discharges between the membrane and the electrodes can be observed during measurements, wherein an electrical grounding of the membrane cannot be carried out since a magnetic field created between the electrodes and required for the measurement would be significantly disturbed, resulting in severely falsified measurement results.

As a further example to find a solution for the above-mentioned need, WO 2014/048911 A1 provides a pressure sensor comprising a detector configured to detect the influence of a variation of a shape of a particularly provided measurement chamber on the electrical field. Here, the detector is supposed to detect the change in the electric field dependent on a change in the shape of the measurement chamber, wherein the change in the shape of the measurement chamber is effected depending on the pressure of the fluid within the measurement chamber.

Accordingly, fluid pressure, and thereby indirectly fluid flow, can be measured through change of capacitance caused by deformation of the deformable measurement chamber filled with the fluid to be measured. In order to provide a scale in the form of an absolute value for the measurement, a rigid-geometry fluid resistor of known geometry and a second measurement chamber are provided, in addition to the initial measurement chamber. The solution as presented in WO 2014/048911 A1, however, present several problems. For example, the measurement system of WO 2014/048911 A1 is not in the position to compensate for imperfections of the fluid to be measured, which imperfections are usually present in liquids in the fork of bubbles, viscosity change, or other inhomogeneities, and, thus, can significantly falsify the desired measurement results. Additionally, in view of the mentioned absolute value for the measurement to be achieved by means of the pre-calibrated fluid resistor, absolute flow measurements can only be done for a specific fluid for which the fluid resistor is calibrated to. Accordingly, for correct absolute measurements, at least the permittivity of a measured fluid must be known before measurement, and, even more importantly, must be maintained throughout all measurements, in order to avoid falsifying the results. Moreover, the use of a flow resistor of rigid geometry necessary for providing scaled measurement values significantly limits the allowed flow rates in order to ensure correct measuring results, since the diameter of such a resistor must be smaller than a diameter of a chamber for correct operation of the sensor system. In addition, in order to be able to maintain sensitivity of the sensor, the geometry of the resistor must be tuned for specific flow rates. Accordingly, the solution as suggested in WO 2014/048911 A1, i.e. the suggested relative measurement approach with two identically working electrode pairs, either fixed or moving, can be used only under the provision that the properties of the fluid are not changing, i.e. that the fluid to be measured remains homogeneous and bubble-free.

Accordingly, there is still the unmet need for an improved disposable pressure or flow sensor system achieving high measurement sensitivity, which system implements non-contact measuring and is not impaired by any kind of imperfections of the fluid to be measured.

SUMMARY OF THE INVENTION

The present disclosure addresses the above-described problems and provides for an improved flow rate sensor system for monitoring a fluid streaming in a fluid channel. According to a first aspect of the present disclosure, a sensor system for determining a flow rate of a fluid flow within a fluid channel is provided, which system comprises a fluid channel, for example in the form of a fluid tube, wherein the fluid channel comprises an elastic segment of the fluid channel, the elastic segment being arranged next to a rigid segment of the fluid channel. Further, the system described herein comprises at least a first pair of electrodes provided at the rigid segment of the fluid channel, wherein the electrodes of the first pair of electrodes are arranged opposing each other, and wherein the first pair of electrodes is in contact with the rigid segment of the fluid channel. Accordingly, the electrodes of the first pair of electrodes occupy a fixed relative positioning with regard to each other. Additionally, at least a second pair of electrodes is provided at the elastic segment of the fluid channel, wherein the electrodes of the second pair of electrodes are also arranged opposing each other, and wherein the second pair of electrodes is in contact with the elastic segment of the fluid channel, similarly to the first pair of electrodes at the rigid segment. Thus, the electrodes of the second pair of electrodes occupy a variable or moveable relative positioning with regard to each other. Moreover, the system described herein comprises a sensor unit for detecting a capacitance of the first pair of electrodes and for detecting a capacitance of the second pair of electrodes, and a processing unit for calculating and monitoring a distance between the electrodes of the second pair of electrodes based on the detected capacitance of the first pair of electrodes and the second pair of electrodes. Here, the processing unit can be adapted to determine a flow rate of the fluid flow within the fluid channel based on a difference in distance between the electrodes of the second pair of electrodes over time. For the sake of correct technical understanding, it should be clear that the elastic segment of the fluid channel comprises a certain elasticity, thereby rendering the elastic segment to be at least moveable in a circumferential manner, whereas the rigid segment of the fluid channel lacks such elasticity, i.e. the rigid segment of the fluid channel maintains its circumferential dimension without the ability of being moveable in a circumferential manner. Also, it should be understood that, in case of the use of a fluid tube, the same usually comprises an annular shape, i.e. a curved outer circumference, meaning that the electrodes can be adapted to such curved shape, resulting in that the distance between the electrodes is to be understood as equivalent effective distance between the electrodes, in view of the lack of a planar correlation.

With an improved flow rate sensor system as previously described, the known problems for flow monitoring, such as the occurrence of air bubbles, false dosages and/or clotting clogging within the fluid channel, which problems occur regularly, can be avoided. These problems generally lead to rising costs at the customer's end, and respectively generated errors are taken into account and accepted by the customer due to the above mentioned price pressure. Compared to the solutions as suggested in the known prior art as described further above, which are not in the position to detect flow rates that are so little, the solution as suggested by the presently discussed flow rate sensor system is in the position to overcome these problems without the necessity of complex algorithms, and with a clear distinction of the different parameters by design. In particular, the flow rate sensor system as presented herein accommodates imperfections of the measured fluid, such as bubbles, viscosity change, and the like, by controlling the relative permittivity $C_i$ of the fluid present in between the first pair of electrodes placed at the rigid segment where a geometry of the system, and in particular a geometry of the fluid channel, is constant. Here, in this particular embodiment of the flow rate sensor system as described herein, a flow to be measured must be directed from the rigid segment of the fluid channel, exhibiting the first pair of electrodes, towards the elastic segment of the fluid channel, exhibiting the second pair of electrodes, in order to be able to use the first pair of electrodes as reference value. The thus measured relative permittivity $\varepsilon_r$ can then be used as a correction parameter for measurements performed by the second pair of electrodes placed at the elastic segment. Accordingly, the unique combination of the first pair of electrodes in the form of a fixed electrode pair and the second pair of electrodes in the form of a moveable electrode pair allows for constant monitoring of the electrical permittivity by means of the fixed electrode pair. In comparison thereto, the moveable electrode pair provides a direct measure of the respective fluid pressure, which can be calculated into a flow rate provided that the other required system parameters are known. Thus, the direct measure of the fluid pressure can be obtained by means of determining the variable distance between the electrodes of the moveable electrode pair, which distance correlates to the fluid pressure and, thus, to the flow rate of the fluid to be measured.

For the above-mentioned calculation, certain considerations are pursued, wherein, in general, any pair of electrodes of the system described herein provides for the general structure of a plate-like capacitor, for which the following applies:

$$C = \varepsilon \times A/d \qquad \text{(Equation 1)}$$

with
C=capacitance of the plate-like capacitor, i.e. the pair of electrodes;
A=cross-sectional area of each electrode of the pair of electrodes;
d=distance between the electrodes of the pair of electrodes;
ε=complex permittivity of the material provided in between the pair of electrodes.

Further, for the complex permittivity ε, the following applies:

$$\varepsilon = \varepsilon_0 \times \varepsilon_r \qquad \text{(Equation 2)}$$

with
$\varepsilon_0$=vacuum/absolute permittivity;
$\varepsilon_r$=relative permittivity of the material provided in between the pair of electrodes, e.g. 2.7 Fm$^{-1}$.

Accordingly, by combining equations 1 and 2 above, the following applies:

$$C = (\varepsilon_0 \times \varepsilon_r) \times A/d \qquad \text{(Equation 3)}$$

$$\varepsilon_r = (C \times d)/A \times \varepsilon_0) \quad \text{(Equation 4)}$$

For the first pair of electrodes, i.e. the fixed electrode pair, the following applies:

$$\varepsilon_r = (C_{1st} \times d_{1st})/A_{1st} \times \varepsilon_0) \quad \text{(Equation 5)}$$

with
$A_{1st}$=surface area of the electrodes of the $1^{st}$ pair of electrodes=constant;
$\varepsilon_0$=vacuum/absolute permittivity;
$d_{1st}$=distance between the electrodes of the $1^{st}$ pair of electrodes=constant.

For the moveable electrode pair, the following applies:

$$C_{2nd} = (\varepsilon_0 \times \varepsilon_r) \times A_{2nd}/d_{2nd} \quad \text{(Equation 6)}$$

with
$A_{2nd}$=surface area of the electrodes of the $2^{nd}$ pair of electrodes=constant;
$\varepsilon_0$=vacuum/absolute permittivity;
$d_{2nd}$=distance between the electrodes of the $2^{nd}$ pair of electrodes=variable.

By inserting $\varepsilon_r$ from equation 5 into equation 6, the variable relative permittivity $\varepsilon_r$ of the fluid can be substituted, and the permittivity $\varepsilon_0$ can be cancelled out. Thereby, the system becomes independent of the variable relative permittivity $\varepsilon_r$ of the fluid and of the vacuum/absolute permittivity $\varepsilon_0$ and depends only on the geometry of the system and the relative expansion of the elastic segment caused by pressure change in the fluid. Accordingly, since the capacitances $C_{1st}$ and $C_{2nd}$ of the first and second pair of electrodes are measured, continuously or intermittently, by means of the flow rate sensor system as described herein, the following applies:

$$C_{2nd} = (C_{1st} \times d_{1st} \times A_{2nd})/(A_{1st} \times d_{2nd}) \quad \text{(Equation 7)}$$

$$d_{2nd} = (C_{1st} \times d_{1st} \times A_{2nd})/(A_{1st} \times C_{2nd}) \quad \text{(Equation 8)}$$

Therefore, under the assumption that the constant values $A_{1st}$, $d_{1st}$ and $A_{2nd}$ are predetermined and, thus, known, the variable distance between the electrodes of the second pair of electrodes, i.e. of the moveable electrode pair can be determined by simply measuring the capacitances $C_{1st}$ and $C_{2nd}$, and its progression over time can be recorded. Based thereon, a difference $\Delta d_{2nd}$ in distance between the electrodes of the second pair of electrodes over time reflects a change of fluid pressure within the elastic segment of the fluid channel. Accordingly, the flow rate sensor system as described herein can be regarded as independent from the relative permittivity $\varepsilon_r$ of the fluid to be measured and only depends on the geometry of its structure and the relative expansion of the elastic segment of the fluid channel caused by a pressure change within the fluid. Therefore, any change of the complex permittivity E signifies a change of the fluids properties, wherein such change in permittivity E can directly be corrected in the form of a new offset between the electrodes of the moveable electrode pair after the permittivity $\varepsilon$ has been observed in the fixed electrode pair, i.e. eliminating one another mathematically.

Concerning the properties of the electrodes used in the flow rate sensor system as described herein, the electrodes of any pair of electrodes can be implemented in the form of plate-like electrodes, which can follow an outer shape of the respective segment of the fluid channel. For example, in the case of a fluid tube as fluid channel, i.e. a tube-shaped fluid channel, the outer shape of the fluid channel can be a circular shape, and the respective opposing electrodes can assume a respectively bent or curved shape. Now, according to a specific embodiment, the first pair of electrodes can be in contact with an outer circumference of a wall of the fluid channel at the rigid segment. Further, the second pair of electrodes can be in contact with an outer circumference of the wall of the fluid channel at the elastic segment. Here, provided that the fluid channel is a continuous channel component having connected segments with different elasticities, i.e. at least one elastic segment and at least one rigid segment, the respective wall of the fluid channel is constituted by the single continuous wall surrounding the fluid channel. Thus, the first pair of electrodes and the second pair of electrodes are in contact with an outer circumference of the single continuous wall surrounding the fluid channel. In further detail, the first pair of electrodes can be attached to the outer circumference of the wall of the fluid channel at the rigid segment. Further, the second pair of electrodes can be attached to the outer circumference of the wall of the fluid channel at the elastic segment. In both cases, attaching the electrodes to the outer circumference of the fluid channel's wall can be implemented by a mechanical connection, by means of an adhesive, or the like. For example, the electrodes can be printed onto the outer circumference of the fluid channel's wall, e.g. in a stripe-shaped manner. Also, in order to compensate for any kind of expansion of the fluid channel, the electrodes can be made of a stretchable material or in the form of a stretchable structure.

According to a further specific embodiment, the electrodes of the second pair of electrodes are movably arranged to one another. Thereby, a change in diameter of the fluid channel at the elastic segment can be followed by a respective change in distance between the electrodes of the second pair of electrodes, i.e. by a movement of the electrodes towards or away from each other. Also, one electrode of the second pair of electrodes provided at the elastic segment of the fluid channel can be arranged in a stationary manner, whereas the other electrode of the second pair of electrodes can be arranged ion a moveable manner, such that only the other electrode follows a change in diameter of the fluid channel at the elastic segment. Thereby, it is also possible to determine a change in diameter of the fluid channel at the elastic segment by a respective change in distance between the electrodes of the second pair of electrodes, i.e. by a movement of the other electrode towards or away from the one electrode. Alternatively or additionally, the electrodes of the second pair of electrodes can be arranged parallel, or basically parallel, to one another. Thus, with such structural correlation, any movement of the electrodes towards or away from each other can occur on a common axis, such as a common central axis of the plate-like electrodes. In general, the electrodes of the first pair of electrodes can also be arranged parallel to each other. Thereby, a positional relationship between the electrodes of the first pair of electrodes adopts a simple stationary parallel positioning, whereas the positional relationship between the electrodes of the second pair of electrodes adopts a moveable parallel positioning, with variable distance in between. Alternatively thereto, the electrodes of the second pair of electrodes can be arranged not in parallel but in an inclined manner to one another, wherein, in case of plate-like electrodes, the same can take on a sharp angle relative to each other, for example in between 20° and 45°. Accordingly, a positional relationship between the electrodes of the first pair of electrodes can again adopt a simple stationary parallel positioning, whereas the positional relationship between the electrodes of the second pair of electrodes adopts a moveable non-parallel positioning, with variable distance and angle in between the electrodes. As an example, the sensor system—and in particular the respective elastic segment of the fluid channel—is designed in the form of a nozzle. In this case, the fluid flow to be measured can only be unidirectional, since the nozzle only works or opens in one direction.

According to a further specific embodiment, the flow rate sensor system as described herein can further comprise at least a third pair of electrodes provided at a further rigid segment of the fluid channel, with the electrodes of the third pair of electrodes being arranged opposing each other. In general, the third pair of electrodes can exhibit identical features as the first pair of electrodes, thereby providing another fixed electrode pair. For example, the third pair of electrodes can be in contact with an outer circumference of the wall of the fluid channel at the further rigid segment, wherein the third pair of electrodes can be attached to the outer circumference of the wall of the fluid channel at the further rigid segment. Moreover, the elastic segment of the fluid channel can be arranged in between the rigid segment exhibiting the first pair of electrodes and the further rigid segment exhibiting the third pair of electrodes. Thereby, it becomes possible to use the flow rate sensor system as described herein independently of a flow direction within the fluid channel, i.e. any flow direction can be applied, and the respective pair of electrodes provided on the rigid segment arranged upstream of the elastic segment can be used as reference value.

According to a further specific embodiment, the flow rate sensor system as described herein can further comprise at least a fourth pair of electrodes provided at a further elastic segment of the fluid channel, with the electrodes of the fourth pair of electrodes being arranged opposing each other, wherein the further rigid segment as defined above can be arranged between the elastic segment and the further elastic segment. In general, the fourth pair of electrodes can exhibit identical features as the second pair of electrodes, thereby providing another moveable electrode pair. For example, the fourth pair of electrodes can be in contact with an outer circumference of the wall of the fluid channel at the further elastic segment, wherein the fourth pair of electrodes can be attached to the outer circumference of the wall of the fluid channel at the further elastic segment. In this regard, having four pairs of electrodes allows for the flow rate sensor system as described herein to accurately follow a change in fluid or e.g. an unwanted bubble as it travels past the electrodes through the sensor system. Here again, any change of permittivity c signifies a change of the fluid's properties, wherein such change in permittivity c can directly be corrected as a new offset in the moveable electrode pairs after it has been observed in the fixed electrode pairs. Thus, the combination of two fixed and two moveable electrode pairs allow even better constant monitoring of the electrical permittivity detected by the first fixed electrode pair. Thus, by applying the above-derived equations to a sensor system with multiple pairs of electrodes in the described configuration, a higher sensitivity of the measurement can be achieved.

According to a further aspect of the present disclosure, a method for determining a flow rate of a fluid flow within a fluid channel by means of a sensor system as described above is also provided herewith. Such method comprises the steps of a) detecting a capacitance of the first pair of electrodes,
b) detecting a capacitance of the second pair of electrodes,
c) calculating a distance between the electrodes of the second pair of electrodes based on the detected capacitance of the first pair of electrodes and the capacitance of the second pair of electrodes, and
d) determining a flow rate of the fluid flow within the fluid channel based on a difference in distance between the electrodes of the second pair of electrodes over time.

The above described method steps can be followed in the given order. However, e.g., steps a) and b) can be switched or carried-out simultaneously without generating a false result. Moreover, additional method steps can be carried out, also in between the above-mentioned method steps, if necessary. The term "detecting" as used in steps a) and b) above is to be understood in the sense of assessing or establishing a certain value for the respective capacitance, in particular by measuring the respective capacitance value of the pairs of electrodes. The calculation step c) of the above-described method is based on the measured capacitance values, and the distance between the electrodes of the second pair of electrodes is calculated based on the derived equation 8 above, i.e.

$$d_{2nd} = (C_{1st} \times d_{1st} \times A_{2nd})/(A_{1st} \times C_{2nd})$$

with
$d_{1st}$=distance between the electrodes of the $1^{st}$ pair of electrodes;
$A_{1st}$=surface area of the electrodes of the $1^{st}$ pair of electrodes;
$d_{2nd}$=distance between the electrodes of the $2^{nd}$ pair of electrodes;
$A_{2nd}$=surface area of the electrodes of the $2^{nd}$ pair of electrodes;
$C_{1st}$=detected capacitance of the $1^{st}$ pair of electrodes; and
$C_{2nd}$=detected capacitance of the $2^{nd}$ pair of electrodes.

Here, as already mentioned above, the values $d_{1st}$, $A_{1st}$ and $A_{2nd}$ are predetermined, i.e. constant, structural features of the system and are known to the user. Since the values $C_{1st}$ and $C_{2nd}$ are detected values of capacitance of the first and second pair of electrodes, the distance $d_{2nd}$ between the electrodes of the second pair of electrodes can be calculated and depends on the detected values of capacitance of the first and second pair of electrodes. Accordingly, a difference $\Delta d_{2nd}$ in distance between the electrodes of the second pair of electrodes can be monitored over time and reflects a change of fluid pressure within the elastic segment of the fluid channel. Thus, the change of fluid pressure can be derived from the difference $\Delta d_{2nd}$ over time.

As basis for a simple mathematical example, a flow rate system with a fluid tube comprising a rigid segment and an elastic segment arranged next to each other is used, wherein a first pair of opposing electrodes is provided at the rigid segment, i.e. a "fixed" $1^{st}$ pair of electrodes, and a second pair of electrodes is provided at the elastic segment, i.e. a "moveable" $2^{nd}$ pair of electrodes. The electrodes of the present example are identical—or at least highly similar- to each other, wherein each electrode exhibits the same cross-sectional area $A_{1st}=A_{2nd}=A_{el}=1$ mm$^2$ Further, the rigid segment comprises a tubing diameter of 1 mm, whereas the elastic segment comprises a tubing diameter of 0.8 mm. Here, the elastic segment can be fully elastic, i.e. the entire elastic segment can expand laterally, or the elastic segment can be implemented by a rigid half tube with an elastic tube-like cover. Now, due to the usual circular shape of a tube, the electrodes attached thereto follow the curved outer diameter, resulting in an equivalent effective distance between the opposing electrodes of the rigid segment $d_{1st}$=0.5 mm, and in an equivalent effective distance between the opposing electrodes of the elastic segment in an initial/unmoved state of $d_{2nd\_unmoved}$=0.4 mm. Here, the elastic segment can endure an exemplary elastic deformation within a range of ±0-0.3 mm, i.e. in both expansion and contraction direction.

Now, in the course of the present example, fluid is introduced into the fluid tube, wherein the fluid flow and, thus, the fluid pressure is negligible. In this case, the measured capacitance of the $1^{st}$ (fixed) electrode pair in this initial/unmoved state is $C_{el1st}$=5.4 mF=const., and the measured capacitance of the $2^{nd}$ (moveable) electrode pair in this initial/unmoved state is $C_{el2nd\_unmoved}$=6.75 mF. Then, fluid pressure is applied to the fluid inside the fluid tube, and fluid flow is generated, resulting in an expansion of the elastic segment and, thus, enlarging the distance between the opposing electrodes of the $2^{nd}$ electrode pair. After a time period of 0.5 s, the measured capacitance of the $1^{st}$ electrode pair remains $C_{el1st}$=5.4 mF, since the $1^{st}$ electrode pair is provided at the rigid segment, resulting in a fixed distance between its opposing electrodes, whereas the measured capacitance of the $2^{nd}$ electrode pair in this moved state is $C_{el2nd\_moved}$=3.857 mF.

In view of the above given parameters and measurement values, and based on the equations presented further above, the moved distance $d_{2nd\_moved}$ of the electrodes of the $2^{nd}$ electrode pair after 0.5 s of expansion is:

$$d_{2nd\_moved} = (C_{el1st} \times d_{1st} \times A_{el})/(A_{el} \times C_{el2nd\_moved}) = (C_{el1st} \times d_{1st})/(C_{el2nd\_moved}) = (C_{el1st}/C_{el2nd\_moved}) \times d_{1st} = 5.4/3.857 \times 0.5 \text{ mm} = 0.7 \text{ mm}$$

Accordingly, the difference of the equivalent effective distance after 0.5 s and in its initial (unmoved) state $\Delta d_{2nd}$ is as follows:

$$\Delta d_{2nd} (0.5 \text{ s}) = 0.7 \text{ mm} - 0.4 \text{ mm} = 0.3 \text{ mm (of expansion)}$$

This means that after 0.5 s of fluid flow, the elastic segment experiences its maximum expansion of 0.3 mm.

Consequently, the expansion ratio of the elastic segment $r_{exp}$=0.7 mm/0.4 mm=1.75, i.e. 75% of expansion of the distance between the electrodes of the $2^{nd}$ pair of electrodes is achieved over a time period of 0.5 s. Here, since the expansion ratio, i.e. the ratio of expansion of the elastic segment of the fluid tube, exhibits a linear dependency with the fluid pressure inside the fluid tube, the expansion of 75% of the distance between the electrodes of the $2^{nd}$ pair of electrodes over a time period of 0.5 s reflects 75% of increase of fluid pressure at the location of the $2^{nd}$ pair of electrodes at the elastic segment over a time period of 0.5 s, i.e. after 0.5 s.

According to a specific embodiment, an elasticity of the elastic segment of the fluid channel can be adjusted based on the expected flow rate within the fluid channel. In further detail, the elasticity, i.e. the elastic modulus, of the elastic segment can be tuned (adjusted modulated) to the estimated or expected flow rates of the fluid within the fluid channel, and also to the expected pressure changes within the fluid channel, so that a respective impact on the measured fluid can be minimized. In further detail, the elasticity of the elastic segment can be adjusted tuned by choosing the material of the elastic segment accordingly. For example, the elastic segment of the fluid tube can be made of the same material as the rigid part, but with a thinner wall thickness, or the elastic segment can be made of a different material than the rigid segment and can be attached to the rigid segment, e.g. by means of fusing or gluing. The same applies in case the elastic segment consists of a rigid part, such as a lower rigid half, together with an elastic cover or elastic upper part or half, attached to the rigid part.

According to a further aspect of the present disclosure, a use of a sensor system as described above for determining a flow rate of a fluid flow within a fluid channel is provided. Here, a movement of the electrodes of the second pair of electrodes towards or away from each other represents a direct measure of a change in fluid pressure of the fluid flowing within the fluid channel. As already described above, such change in fluid pressure can be calculated into a flow rate of the fluid flowing within the fluid channel, without the necessity of a flow resistor or the like. Here again, a scaling of the fluid flow within the fluid channel of the sensor system is achieved by means of capacitance measurements between electrodes placed on the rigid segment of the fluid channel.

The above described method steps can be controlled by a control unit used in cooperation with the sensor system as described herein, which can also control any kind of actuation or monitoring of the above described system and its components, wherein the term "control unit" as used herein encompasses any physical or virtual processor, such as a CPU or the like, which can also control the entire system or even an entire workstation comprising one or more of the sensor system as described herein in a way that workflow(s) and workflow step(s) are conducted. The control unit can include the above-mentioned sensor unit and the processing unit. The control unit may, for example, carry different kinds of application software and instruct the sensor system or a respective superordinate instrument or workstation to conduct respective workflow(s) or workflow step(s). The control unit may receive information from a data management unit regarding which steps need to be performed with a certain fluid. Further, the control unit might be integral with a data management unit, may be comprised by a server computer and/or be part of one device or even distributed across multiple devices of a respective workstation. For Instance, the control unit may be embodied as a programmable logic controller running a computer-readable program provided with instructions to perform operations. Here, in order to receive such instructions by a user, a user interface can additionally be provided, wherein the term "user interface" as used herein encompasses any suitable piece of application software and/or hardware for interactions between an operator and a machine, including but not limited to a graphical user interface for receiving as input a command from an operator and also to provide feedback and convey information thereto. Also, such a system may expose several user interfaces to serve different kinds of users/operators.

As used herein and in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above,", "previously" and "below" and words of similar import, when used in this application, shall refer to this application as a whole and not to any particular portions of the application.

Furthermore, certain terms are used for reasons of convenience and are not intended to limit the disclosure. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or figure does not imply that the aspect is missing from embodiments that incorporate that aspect. Instead, the aspect may have been omitted for clarity, and in order to avoid prolix description. In this context, the following applies to the rest of this description: If, in order to clarify the drawings, a figure contains reference signs, which signs are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

The following examples are intended to illustrate various specific embodiments of the present disclosure. As such, the specific modifications as discussed hereinafter are not to be construed as limitations on the scope of the present disclosure. It will be apparent to the person skilled in the art that various equivalents, changes, and modifications may be made without departing from the scope of the present disclosure, and it is thus to be understood that such equivalent embodiments are to be included herein. Further aspects and advantages of the present disclosure will become apparent from the following description of particular embodiments illustrated in the figures.

LIST OF REFERENCE SIGNS 1, 1', 1" sensor system
2; 2', 2" fluid channel
21 rigid segment of the fluid channel
22, 22', 22" elastic segment of the fluid channel
23 rigid segment of the fluid channel
24, 24', 24" wall of the fluid channel
25, 25', 25" outer circumference of the wall of the fluid channel
3 fixed electrode pair/$1^{st}$ pair of electrodes
31 fixed electrode of the fixed electrode pair
32 opposing fixed electrode of the fixed electrode pair
4, 4', 4" moveable electrode pair/$2^{nd}$ pair of electrodes
41, 41" moveable electrode of the moveable electrode pair
42, 42" opposing moveable electrode of the moveable electrode pair
41' fixed electrode of the moveable electrode pair
42' moveable electrode of the moveable electrode pair 5 further fixed electrode pair/3$^{rd}$ pair of electrodes
51 fixed electrode of the further fixed electrode pair
52 opposing fixed electrode of the further fixed electrode pair
6 bidirectional fluid flow
7 unidirectional fluid flow
$A_{1st}$ surface area of the electrodes of the fixed electrode pair
$A_{2nd}$, $A'_{2nd}$, $A''_{2nd}$ surface area of the electrodes of the moveable electrode pair
$A_{3rd}$ surface area of the electrodes of the further fixed electrode pair
$d_{1st}$ distance between the electrodes of the fixed electrode pair
$d_{2nd}$, $d'_{2nd}$, $d''_{2nd}$ distance between the electrodes of the moveable electrode pair
$d_{3rd}$ distance between the electrodes of the fixed electrode pair
S1 method step
S2 method step
S3 method step
S4 method step

DETAILED DESCRIPTION

Figure 1A:
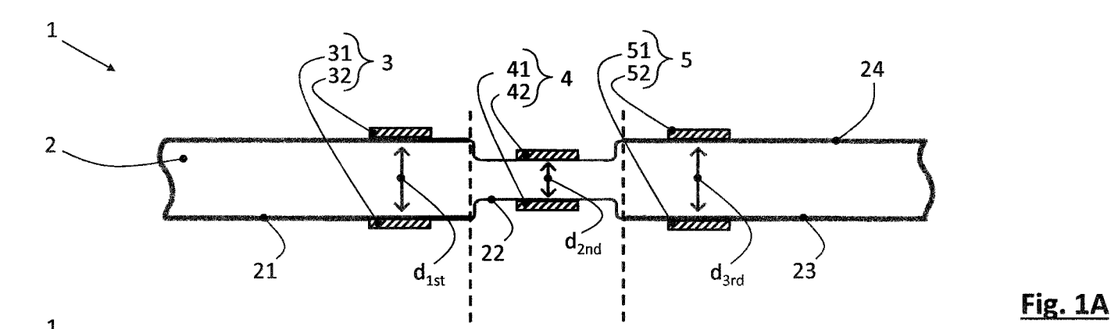
FIG. 1A is a schematic functional illustration of a sensor system according to an embodiment of the present disclosure in a cross-sectional view, without fluid flow within its fluid channel.
Figure 1B:
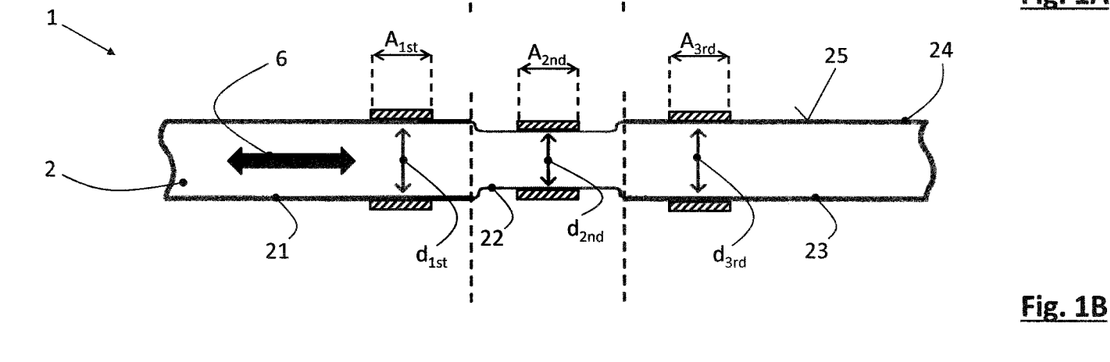
FIG. 1B is a schematic functional illustration of the sensor system according to the embodiment as shown in FIG. 1A in a cross-sectional view, with fluid flow within its fluid channel.

FIGS. 1A and 1B show a part of a sensor system 1 according to a first embodiment of the present disclosure. Here, it is pointed out that a sensor unit and a processing unit in general being part of the sensor system 1 of the present disclosure are not illustrated in the drawings for the sake of simplification. However, it is to be noted that the sensor unit and the processing unit are interconnected and are connected to the respective electrodes of the sensor system 1. Now, the shown part of the sensor system 1 comprises a tubular fluid channel 2 and a first pair 3 of electrodes 31, 32 at a rigid segment 21 of the fluid channel 2, with the electrodes 31, 32 being fixed with respect to each other and attached to, e.g. printed onto, an outer circumference 25 of a wall 24 of the fluid channel 2 at the rigid segment 21. Furthermore, the sensor system 1 comprises a second pair 4 of electrodes 41, 42 at an elastic segment 22 of the fluid channel 2, with the electrodes 41, 42 being arranged in a moveable manner with respect to each other and attached to, e.g. printed onto, an outer circumference 25 of a wall 24 of the fluid channel 2 at the elastic segment 22. Accordingly, a bidirectional flow 6 of a fluid within the fluid channel 2 can be measured through change of capacitance of the electrode pair 4 caused by the change in distance between these electrodes 41, 42. This change in distance is generated by elastic deformation of the elastic segment 22 caused by an increase of fluid pressure of a fluid flowing within the fluid channel 2. Here, at least the electrodes 41, 42 of the second electrode pair 4 are made of a stretchable material, or in a stretchable fashion, in order to be able to compensate for any expansion/contraction of the elastic segment 22. Moreover, the sensor system 1 further comprises a third pair 5 of electrodes 51, 52 at a further rigid segment 23 of the fluid channel 2, with the electrodes 51, 52 being fixed with respect to each other and attached to an outer circumference 25 of a wall 24 of the fluid channel 2 at the rigid segment 23. Here, the third pair 5 of electrodes 51, 52 is optional and is not necessarily required for carrying out the present disclosure; however, providing the third electrode pair 5 can account for the detection of a further change of the fluid flowing within the fluid channel 2. Accordingly, in FIGS. 1A and 1B, the part of the fluid channel 2 show in these illustrations comprises the first rigid segment 21, the elastic segment 22 and the further rigid segment 23, wherein transition areas between those segments are without substantial interruption, and the wall 24 of the fluid channel 2 is substantially continuous, in particular in order to avoid any disturbances of the fluid flowing inside the fluid channel 2.

As can be gathered from FIGS. 1A and 1B, a diameter of the fluid channel 2 at the elastic segment 22 is smaller than a diameter at the rigid segment 21 or as a diameter at the rigid segment 23. The difference in diameters can also be gathered from FIGS. 1A and 1B in the difference in distances between the respective electrodes, i.e. a distance $d_{1st}$ between the electrodes 31, 32 of the first pair 3 of electrodes 31, 32 provided at the left rigid segment 21 is larger than a distance $d_{2nd}$ between the electrodes 41, 42 of the second pair 4 of electrodes 41, 42 provided at the elastic segment 22 arranged in between the rigid segment 21 on the left side and the further rigid segment 23 on the right side of FIGS. 1A and 1B. Also, a distance $d_{3rd}$ between the electrodes 51, 52 of the third pair 5 of electrodes 51, 52 provided at the rigid segment 23 arranged at the right side in the drawings is larger than a distance $d_{2nd}$ between the electrodes 41, 42 of the second pair 4 of electrodes 41, 42 provided at the elastic segment 22 arranged in between the rigid segments 21, 23. In the present case, the distances $d_{1st}$ and $d_{3rd}$ of the rigid segments 21, 23, i.e. their diameters, coincide with each other, for the sake of simplification; the distances $d_{1st}$ and $d_{3rd}$ of the rigid segments 21, 23, however, can also differ from each other, as long as their exact dimensions are known. In FIGS. 1A and 1B, the different segments 21, 22, 23 are illustratively separated from each other by means of linear dotted lines.

In FIG. 1A, the sensor system 1 may already comprise a fluid, such as a liquid to be measured, inside the fluid channel 2. However, FIG. 1A shows an initial state of the sensor system 1, in which there is no fluid flow within the fluid channel 2. In FIG. 1B, on the contrary, fluid flow 6 is present within the fluid channel 2, which can be gathered by the enlarged distance $d_{2nd}$, which can also be referred to as $d_{2nd\_moved}$, between the electrodes 41, 42 attached to the outer circumference 25 of the wall 24 of the fluid channel 2 at the elastic segment 22, compared to the distance $d_{2nd}$ between the electrodes 41, 42 in the initial state as depicted in FIG. 1A, which can also be referred to as $d_{2nd\_unmoved}$. Here, since rigid segments 21, 23 including respective electrode pairs 3, 5 are provided on both sides of the elastic segment 22, the fluid flow 6 to be measured can flow in either direction within the fluid channel 2, since, thus, either electrode pair 3, 5 can be used as reference value. In this regard, it can be gathered from the differing distances $d_{2nd}$ between the electrodes 41, 42 in the initial state as depicted in FIG. 1A and the enlarged state as depicted in FIG. 1B that FIG. 1A shows a state of the sensor system 1 before expansion, and that FIG. 1B shows a state of the sensor system 1 during fluid flow 6, i.e. after expansion of the elastic segment 22.

As can also be gathered from FIGS. 1A and 1B, the surface areas $A_{1st}$ of the electrodes 31, 32 of the first pair 3 of electrodes 31, 32, illustrated in the drawings of FIGS. 1A and 1B in a lateral dimension of the surface area $A_{1st}$, coincide with each other, in order to achieve a clear capacitor relationship between these electrodes. Similarly thereto, the surface areas $A_{2nd}$ of the electrodes 41, 42 of the second pair 4 of electrodes 41, 42 coincide with each other, and the surface areas $A_{3rd}$ of the electrodes 51, 52 of the third pair 5 of electrodes 51, 52 also coincide with each other, for the same reason. Thus, based on the above described equation 8, the distance $d_{2nd}$ between the electrodes 41, 42 of the second electrode pair 4, i.e. the only moveable electrode pair in the present embodiment compared to the fixed electrode pairs 3, 5, can be calculated based on the measured capacitances of the fixed electrode pairs 3, 5. Repeating this calculation over time results in a timely progression of the distance $d_{2nd}$, which timely progression represents a change of fluid pressure of the fluid flowing within the elastic segment 22 of the fluid channel 2. Thus, monitoring the timely progression of the distance $d_{2nd}$ corresponds to the monitoring of a timely progression of the fluid pressure of the fluid flowing within the elastic segment 22 of the fluid channel 2.

In FIGS. 1A and 1B, the electrodes 31, 32, 41, 42, 51, 52 of the electrode pairs 3, 4, 5 are depicted as plate-like components in a cross-sectional view. Here, as an example, the electrodes 31, 32, 41, 42, 51, 52 of the electrode pairs 3, 4, 5 can have a generally plate-like shape, which shape can follow the tubular curvature of the outer circumference 25 of the wall 24 of the fluid channel 2 at least in part. Here, the overall dimensions and shapes of the opposing electrodes 31 and 32, 41 and 42, 51 and 52 correspond to each other, in order to achieve a clear capacitor relationship between these electrodes 31 and 32, 41 and 42, 51 and 52 of each electrode pair 3, 4 and 5.

Figure 2A:
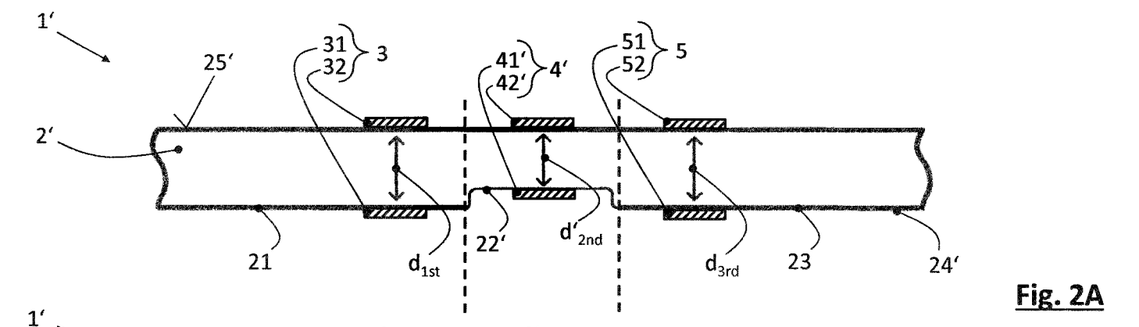
FIG. 2A is a schematic functional illustration of a sensor system according to a second embodiment of the present disclosure in a cross-sectional view, without fluid flow within its fluid channel.
Figure 2B:
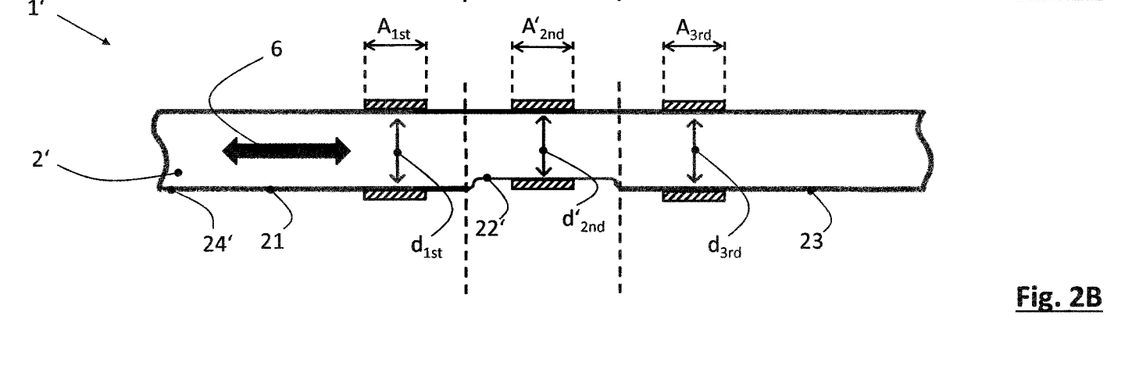
FIG. 2B is a schematic functional illustration of the sensor system according to the second embodiment as shown in FIG. 2A in a cross-sectional view, with fluid flow within its fluid channel.

In FIGS. 2A and 2B, a sensor system 1' in accordance with a second or modified embodiment of the sensor system as described herein is depicted. Here, there is a significant difference compared to the sensor system 1 as shown in FIGS. 1A and 1B in that the moveable electrode pair is implemented by means of a pair 4' of electrodes 41', 42' consisting of a fixed electrode 41' and a moveable electrode 42'. This can also be gathered from FIGS. 2A and 2B when comparing the change in diameter $d'_{2nd}$ between the electrodes 41', 42' in an initial state as depicted in FIG. 2A and in an enlarged state as depicted in FIG. 2B. The remaining parts of the sensor system 1' of the second embodiment are basically identical to the respective parts of the sensor system 1 as illustrated in FIGS. 1A and 1B and as described above. For the sake of completeness, it is pointed out that FIGS. 2A and 2B show only a part of the sensor system 1' according to the second embodiment of the present disclosure, wherein a sensor unit and a processing unit in general being part of the sensor system 1' of the present disclosure are again not illustrated in the drawings for the sake of simplification. However, it is to be noted that the sensor unit and the processing unit are interconnected and are connected to the respective electrodes of the sensor system 1. The part of the sensor system 1' shown in FIGS. 2A and 2B exhibits a tubular fluid channel 2' and a first pair 3 of electrodes 31, 32 at a rigid segment 21 of the fluid channel 2', with the electrodes 31, 32 being fixed with respect to each other and attached to an outer circumference 25' of a wall 24' of the fluid channel 2' at the rigid segment 21. Furthermore, the sensor system 1' comprises a second pair 4' of electrodes 41', 42' at an elastic segment 22' of the fluid channel 2', with the electrodes 41', 42' being arranged opposing each other, and wherein the electrode 41' constitutes a fixed electrode 41' and the electrode 42' constitutes a moveable electrode 42' arranged in moveable manner with respect to the fixed electrode 41'. Here, both electrodes 41' and 42' are attached to an outer circumference 25' of a wall 24' of the fluid channel 2' at the elastic segment 22'.

Accordingly, the flow 6 of a fluid within the fluid channel 2' can be measured through change of capacitance of the electrode pair 4' caused by the change in distance between these electrodes 41', 42'. This change in distance is generated by elastic deformation of the elastic segment 22' caused by an increase of fluid pressure of a fluid flowing within the fluid channel 2'. Moreover, and similar to the sensor system 1 as illustrated in FIGS. 1A and 1B, the sensor system 1' further comprises a third pair 5 of electrodes 51, 52 at a further rigid segment 23 of the fluid channel 2', with the electrodes 51, 52 being fixed with respect to each other and attached to an outer circumference 25' of a wall 24' of the fluid channel 2' at the rigid segment 23. Here again, the third pair 5 of electrodes 51, 52 is optional and is not necessarily required for carrying out the present disclosure; however, providing the third electrode pair 5 can account for the detection of a further change of the fluid flowing within the fluid channel 2'. Accordingly, in FIGS. 2A and 2B, the part of the fluid channel 2' show in these illustrations comprises the first rigid segment 21, the elastic segment 22' and the further rigid segment 23, wherein transition areas between those segments are without substantial interruption, and the wall 24' of the fluid channel 2' is substantially continuous, in particular in order to avoid any disturbances of the fluid flowing inside the fluid channel 2'.

As can be gathered from FIGS. 2A and 2B, a diameter of the fluid channel 2' at the elastic segment 22' is smaller than a diameter at the rigid segment 21 or as a diameter at the rigid segment 23. The difference in diameters can also be gathered from FIGS. 2A and 2B in the difference in distances between the respective electrodes, i.e. a distance $d_{1st}$ between the electrodes 31, 32 of the first pair 3 of electrodes 31, 32 provided at the left rigid segment 21 is larger than a distance $d'_{2nd}$ between the electrodes 41', 42' of the second pair 4' of electrodes 41', 42' provided at the elastic segment 22' arranged in between the rigid segment 21 on the left side and the further rigid segment 23 on the right side of FIGS. 2A and 2B. Also, a distance $d_{3rd}$ between the electrodes 51, 52 of the third pair 5 of electrodes 51, 52 provided at the right rigid segment 23 is larger than a distance $d'_{2nd}$ between the electrodes 41', 42' of the second pair 4' of electrodes 41', 42' provided at the elastic segment 22' arranged in between the rigid segments 21, 23. In the present case, the distances $d_{1st}$ and $d_{3rd}$ of the rigid segments 21, 23, i.e. their diameters, coincide with each other, for the sake of simplification; the distances $d_{1st}$ and $d_{3rd}$ of the rigid segments 21, 23, however, can also differ from each other, as long as their exact dimensions are known. In FIGS. 2A and 2B, the different segments 21, 22', 23 are again illustratively separated from each other by means of linear dotted lines.

In FIG. 2A, the sensor system 1' may already comprise a fluid, such as a liquid to be measured, inside the fluid channel 2'. However, FIG. 2A shows an initial state of the sensor system 1', in which there is no fluid flow within the fluid channel 2'. In FIG. 2B, on the contrary, fluid flow 6 is present within the fluid channel 2', which can be gathered by the enlarged distance $d'_{2nd}$, which can also be referred to as $d'_{2nd\_moved}$, compared to the distance $d'_{2nd}$ between the electrodes 41', 42' in the initial state as depicted in FIG. 2A, which can also be referred to as $d'_{2nd\_unmoved}$. Here, since rigid segments 21, 23 including respective electrode pairs 3, 5 are provided on both sides of the elastic segment 22', the fluid flow 6 to be measured can flow in either direction within the fluid channel 2', since, thus, either electrode pair 3, 5 can be used as reference value. In this regard, it can be gathered from the differing distances $d'_{2nd}$ between the electrodes 41', 42' in the initial state as depicted in FIG. 2A and the enlarged state as depicted in FIG. 2B that FIG. 2A shows a state of the sensor system 1' before expansion, and that FIG. 1B shows a state of the sensor system 1' during fluid flow 6, i.e. after expansion of the elastic segment 22'. As already described above, due to the fact that the electrode 41' is constituted by a fixed electrode, and the respective part of the wall 24' of the fluid channel 2' is, thus, also fixedly arranged, the lower part of the wall 24' of the fluid channel 2' at which the loveable electrode 2' is arranged is the part of the fluid channel 2' which expands in line with the fluid pressure within the fluid channel 2'.

As can also be gathered from FIGS. 2A and 2B, the surface areas $A_{1st}$ of the electrodes 31, 32 of the first pair 3 of electrodes 31, 32, illustrated in the drawings of FIGS. 2A and 2B in a lateral dimension of the surface area $A_{1st}$, coincide with each other, in order to achieve a clear capacitor relationship between these electrodes. Similarly thereto, the surface areas $A'_{2nd}$ of the electrodes 41', 42' of the second pair 4' of electrodes 41', 42' coincide with each other, and the surface areas $A_{3rd}$ of the electrodes 51, 52 of the third pair 5 of electrodes 51, 52 also coincide with each other, for the same reason. Thus, based on the above described equation 8, which is to be adapted to the presently used reference signs accordingly, the distance $d'_{2nd}$ between the electrodes 41', 42' of the second electrode pair 4', i.e. the only electrode pair in the present embodiment with variable distance in between electrodes compared to the fixed electrode pairs 3, 5, can be calculated based on the measured capacitances of the fixed electrode pairs 3, 5. Repeating this calculation over time results in a timely progression of the distance $d'_{2nd}$, which timely progression represents a change of fluid pressure of the fluid flowing within the elastic segment 22' of the fluid channel 2'. Thus, monitoring the timely progression of the distance $d'_{2nd}$ corresponds to the monitoring of a timely progression of the fluid pressure of the fluid flowing within the elastic segment 22' of the fluid channel 2'.

In FIGS. 2A and 2B, the electrodes 31, 32, 41', 42', 51, 52 of the electrode pairs 3, 4', 5 are depicted as plate-like components in a cross-sectional view. Here again, as an example, the electrodes 31, 32, 41', 42', 51, 52 of the electrode pairs 3, 4', 5 can have a generally plate-like shape, which shape can follow the tubular curvature of the outer circumference 25' of the wall 24' of the fluid channel 2' at least in part. Here, the overall dimensions and shapes of the opposing electrodes 31 and 32, 41' and 42', 51 and 52 correspond to each other, in order to achieve a clear capacitor relationship between these electrodes 31 and 32, 41' and 42', 51 and 52 of each electrode pair 3, 4' and 5.

Figure 3A:
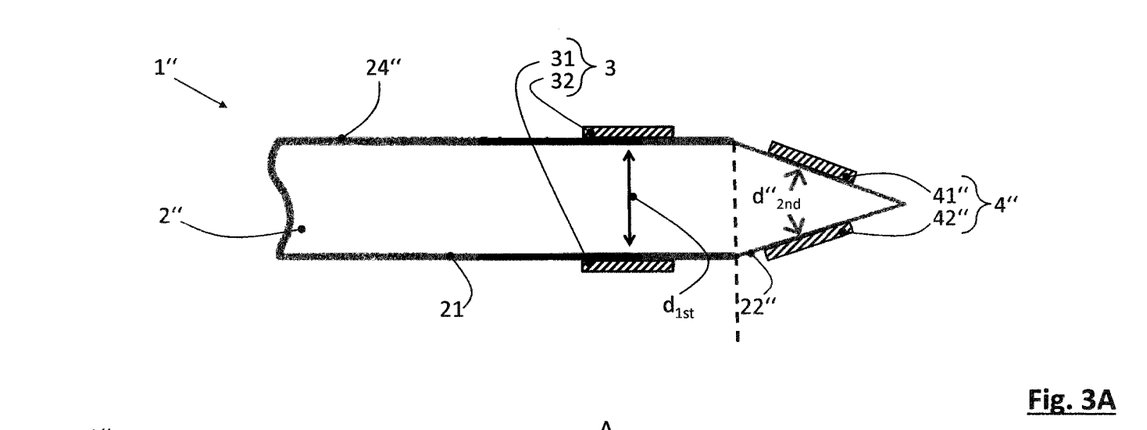
FIG. 3A is a schematic functional illustration of a sensor system according to a third embodiment of the present disclosure in a cross-sectional view, without fluid flow within its fluid channel.
Figure 3B:
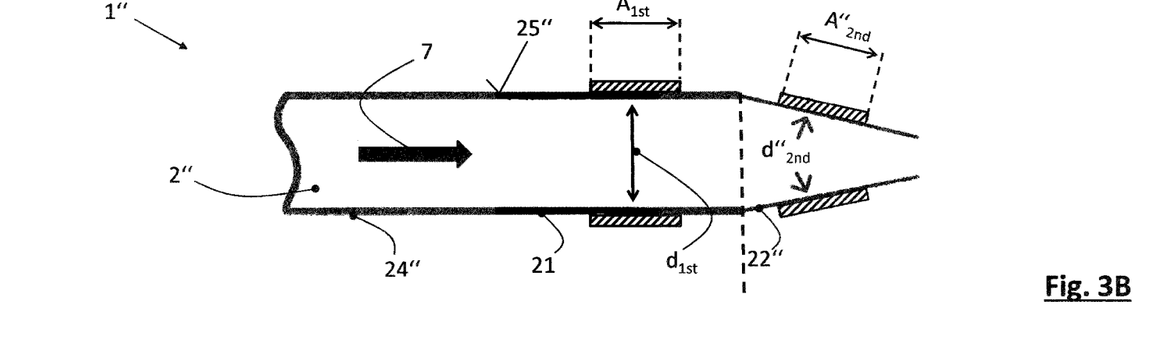
FIG. 3B is a schematic functional illustration of the sensor system according to the third embodiment as shown in FIG. 3A in a cross-sectional view, with fluid flow within its fluid channel.

FIGS. 3A and 3B show a part of a sensor system 1'' according to a third embodiment of the present disclosure. Here again, a sensor unit and a processing unit being, in general, part of the sensor system 1'' of the present disclosure are not illustrated in the drawings for the sake of simplification. However, it is to be noted that the sensor unit and the processing unit of the presently described embodiment are interconnected and are connected to the respective electrodes of the sensor system 1''. Now, the part of the sensor system 1'' shown in FIGS. 3A and 3B comprises a tubular fluid channel 2'' and a first pair 3 of electrodes 31, 32 arranged at a rigid segment 21 of the fluid channel 2', with the electrodes 31, 32 being fixed with respect to each other and attached to an outer circumference 25'' of a wall 24'' of the fluid channel 2'' at the rigid segment 21. Furthermore, the sensor system 1'' comprises a second pair 4'' of electrodes 41'', 42'' at an elastic segment 22'' of the fluid channel 2'', with the electrodes 41'', 42'' being arranged in a moveable manner with respect to each other and attached to an outer circumference 25'' of a wall 24'' of the fluid channel 2'' at the elastic segment 22''. Here, even though the fluid channel 2'' provides for a tubular shape, the elastic segment 22'' does not exhibit a continuous diameter but rather a converging shape with a decreasing diameter when viewed from left to right in FIGS. 3A and 3B, contrary to the above-described first and second embodiments. Thus, the elastic segment 22'' constitutes a nozzle-like shape, with the wall 24'' reducing its diameter so that, in cross-section, the wall 24'' converges into a sharp angle. In an initial state as illustrated in FIG. 3A, i.e. in a state in which no fluid flow is present within the fluid channel 2'', the wall 24'' actually closes up at the downstream end of the elastic segment 22'', thereby constituting an angle, in cross-section, of e.g. 30°-40°, depending on the length of the elastic segment 22''. Accordingly, the electrodes 41'', 42'' attached to the outer circumference 25'' of the wall 24'' of the fluid channel 2'' also take the same angle relative to each other, thereby constituting an angled positional relationship. Concerning the forming of a plate-like capacitor, the same is also achieved by means of an angled relative positioning of the electrodes, as known to the skilled person. In FIG. 3B, an active state of the fluid channel 2'' is shown, i.e. a fluid is flowing through the fluid channel 2'' in a direction from the rigid segment 21 to the elastic segment 22'', thereby opening up the closed end of the elastic segment 22'' and moving the electrodes 41'', 42'' away from each other. In the presently described third embodiment, due to the converging structure of the nozzle-like elastic segment 22'', the fluid can only flow in the direction from the rigid segment 21 to the elastic segment 22'', since the closed end of the elastic segment 22'' as depicted in FIG. 3B does not allow entry of fluid from the right side in the drawing, resulting in the elastic segment 22'' being arranged downstream of the rigid segment 21.

In accordance with the opening of the closed end of the elastic segment 22'', the flow 7 of the fluid within the fluid channel 2'' can be measured through change of capacitance of the electrode pair 4'' caused by the change in distance between these electrodes 41'', 42'' due to the angle-widening movement of the elastic segment 22''. This change in distance is again allowed by elastic deformation of the elastic segment 22'' caused by an increase of fluid pressure of the fluid flowing within the fluid channel 2''. In the presently described third embodiment, no further electrode pair is used, contrary to the previously described embodiments. Accordingly, in FIGS. 3A and 3B, the part of the fluid channel 2'' show in these illustrations comprises the first rigid segment 21 and the nozzle-like elastic segment 22'', wherein a transition area between those segments is again implemented without substantial interruption, and the wall 24'' of the fluid channel 2'' is substantially continuous, in particular in order to avoid any disturbances of the fluid flowing inside the fluid channel 2''.

As can be gathered from FIGS. 3A and 3B, a diameter of the fluid channel 2'' at the elastic segment 22'' in a position at which the electrodes 41'', 42' are arranged is smaller than a diameter at the rigid segment 21. The difference in diameter can also be gathered from FIGS. 3A and 3B in the difference in distances between the respective electrodes, i.e. a distance $d_{1st}$ between the electrodes 31, 32 of the first pair 3 of electrodes 31, 32 provided at the rigid segment 21 at the left side is larger than a distance $d''_{2nd}$ between the electrodes 41'', 42'' of the second pair 4'' of electrodes 41'', 42'' provided at the elastic segment 22'' arranged on the right side of FIGS. 3A and 3B. In FIGS. 3A and 3B, the different segments 21, 22'' of the fluid channel 2'' are illustratively separated from each other by means of a linear dotted line.

In FIG. 3A, the sensor system 1'' may already comprise a fluid, such as a liquid to be measured, inside the fluid channel 2'', however with a closed end of the elastic segment 2'' at its downstream end. Thus, FIG. 3A shows an initial state of the sensor system 1'', in which there is no fluid flow within the fluid channel 2''. In FIG. 3B, on the contrary, unidirectional fluid flow 7 is present within the fluid channel 2", which can be gathered by the enlarged distance $d''_{2nd}$, which can also be referred to as $d''_{2nd\_moved}$, between the electrodes 41", 42" attached to the outer circumference 25" of the wall 24" of the fluid channel 2" at the elastic segment 22", and the opening of the downstream end of the elastic segment 22", compared to the distance $d''_{2nd}$ between the electrodes 41", 42" in the initial state as depicted in FIG. 3A, which can also be referred to as $d'_{2nd\_unmoved}$. In this regard, it can be gathered from the differing distances $d''_{2nd}$ between the electrodes 41", 42" in the initial state as depicted in FIG. 3A and the enlarged state as depicted in FIG. 3B that FIG. 3A shows a state of the sensor system 1" before expansion, and that FIG. 3B shows a state of the sensor system 1" during fluid flow 7, i.e. after opening expansion of the elastic segment 22".

As can also be gathered from FIGS. 3A and 3B, the surface areas $A_{1st}$ of the electrodes 31, 32 of the first pair 3 of electrodes 31, 32, illustrated in the drawings of FIGS. 3A and 3B in a lateral dimension of the surface area $A_{1st}$, coincide with each other, in order to achieve a clear capacitor relationship between these electrodes. Further, the surface areas $A''_{2nd}$ of the electrodes 41", 42" of the second pair 4" of electrodes 41", 42" coincide with each other. Thus, based on the above described equation 8, the distance $d''_{2nd}$ between the electrodes 41", 42" of the second electrode pair 4", i.e. the moveable electrode pair in the present embodiment compared to the fixed electrode pair 3, can be calculated based on the measured capacitance of the fixed electrode pair 3. Repeating this calculation over time results in a timely progression of the distance $d''_{2nd}$, which timely progression represents a change of fluid pressure of the fluid flowing within the elastic segment 22" of the fluid channel 2". Thus, monitoring the timely progression of the distance $d''_{2nd}$ corresponds to the monitoring of a timely progression of the fluid pressure of the fluid flowing within the elastic segment 22" of the fluid channel 2".

In FIGS. 3A and 3B, the electrodes 31, 32, 41", 42" of the electrode pairs 3, 4" are depicted as plate-like components in a cross-sectional view. Here, as an example, the electrodes 31, 32, 41", 42" of the electrode pairs 3, 4" can have a generally plate-like shape, which shape can follow the tubular curvature of the outer circumference 25" of the wall 24" of the fluid channel 2" at least in part. Here, the overall dimensions and shapes of the opposing electrodes 31 and 32 and 41" and 42" correspond to each other.

Figure 4:
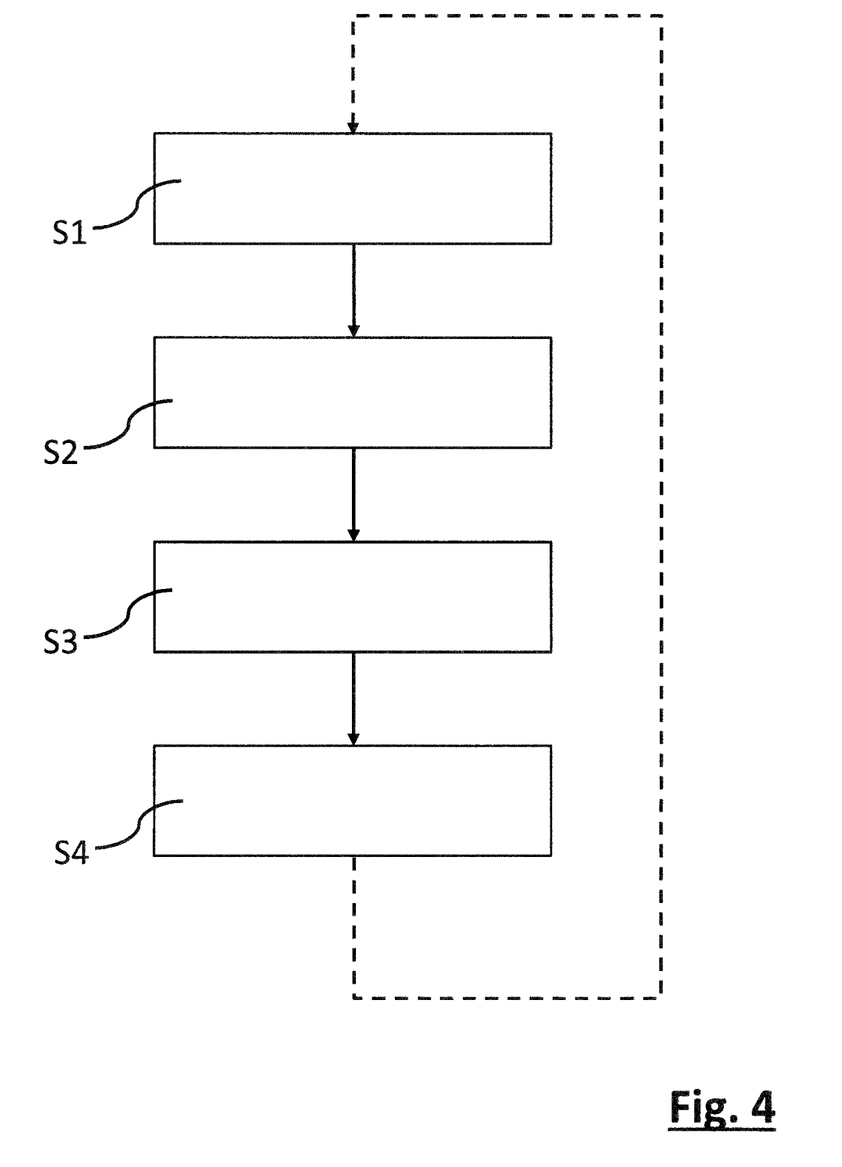
FIG. 4 is a flowchart of a method according to an embodiment of the present disclosure.

Finally, FIG. 4 shows a flowchart of a method for determining the flow rate of a fluid flow within a fluid channel by means of a sensor system as described above, wherein step S1 constitutes a step of detecting a capacitance of the first pair of electrodes, such as the capacitance generated between the electrodes of the fixed electrode pair, step S2 constitutes a step of detecting a capacitance of the second pair of electrodes, such as the capacitance generated between the electrodes of the moveable electrode pair, step S3 constitutes a step of calculating a distance between the electrodes of the second pair of electrodes based on the detected capacitance of the first pair of electrodes and the capacitance of the second pair of electrodes, and step S4 constitutes a step of determining a flow rate of the fluid flow within the fluid channel based on a difference in distance between the electrodes of the second pair of electrodes over time. As an example, steps S1 and S2 can be carried-out by the sensor unit of the respective sensor system, and steps S3 and S4 can be carried-out by a processing unit of the respective sensor system. Alternatively, steps S1 and S2 can be carried out simultaneously, whereas steps S3 and S4 are carried-out subsequently. Further, any one of steps S1 and S2 can include the detection of the capacitances of several pairs of electrodes, such as, for step S1, the detection of the capacitances of several pairs of fixed electrodes provided at different rigid segments of the respective fluid channel, and, for step S2, the detection of the capacitances of several pairs of moveable electrodes provided at different elastic segments of the respective fluid channel.

In further detail, the calculation step S3 of the above-described method is based on the measured capacitance values, and the distance between the electrodes of the second pair of electrodes is then calculated as already described in detail further above. Furthermore, in regard to the method as described in view of FIG. 4, an elasticity of a respective elastic segment of the fluid channel can be adjusted based on the expected flow rate within the fluid channel beforehand, i.e. in advance before carrying out the described method, for example in the form of an optional pre-step S0. Here, the elasticity, i.e. the elastic modulus, of the elastic segment can be adjusted to the estimated or expected flow rates of the fluid within the fluid channel, and/or can be adjusted to the expected pressure changes within the fluid channel, so that a respective impact on the measured fluid can be minimized.

While the current disclosure has been described in relation to its specific embodiments, it is to be understood that this description is for illustrative purposes only. Accordingly, it is intended that the disclosure be limited only by the scope of the claims appended hereto.

The invention claimed is:

1. A sensor system for determining a flow rate of a fluid flow within a fluid channel, the system comprising:
   a fluid channel comprising an elastic segment arranged next to at least one rigid segment,
   at least a first pair of fixed electrodes attached to an outer wall of said rigid segment of the fluid channel such that they are fixed with respect to each other, the electrodes of the first pair of electrodes being arranged opposing each other,
   at least a second pair of movable electrodes attached to an outer wall of said elastic segment of the fluid channel such that the second pair of electrodes are movably arranged to one another, the electrodes of the second pair of electrodes being arranged opposing each other,
   a sensor unit for detecting a capacitance of the first pair of electrodes and the second pair of electrodes, and
   a processing unit for calculating and monitoring a distance between the electrodes of the second pair of electrodes based on the detected capacitance of both the first pair of fixed electrodes and the second pair of movable electrodes.

2. The sensor system according to claim 1, wherein the electrodes of the second pair of electrodes are arranged parallel to one another.

3. The sensor system according to claim 1, wherein the electrodes of the second pair of electrodes are arranged in an inclined manner to one another.

4. The sensor system according to claim 1, wherein the sensor system further comprises at least a third pair of electrodes provided at a further rigid segment of the fluid channel, with the electrodes of the third pair of electrodes being arranged opposing each other, and wherein the elastic segment of the fluid channel is arranged in between the rigid segment exhibiting the first pair of electrodes and the further rigid segment exhibiting the third pair of electrodes.

5. The sensor system according to claim 4, wherein the third pair of electrodes is in contact with an outer circumference of the wall of the fluid channel at the further rigid segment, wherein the third pair of electrodes is attached to the outer circumference of the wall of the fluid channel at the further rigid segment.

6. The sensor system according to claim 4, wherein the sensor system further comprises at least a fourth pair of electrodes provided at a further elastic segment of the fluid channel, with the electrodes of the fourth pair of electrodes being arranged opposing each other, and wherein the further rigid segment is arranged between the elastic segment and the further elastic segment.

7. The sensor system according to claim 6, wherein the fourth pair of electrodes is in contact with an outer circumference of the wall of the fluid channel at the further elastic segment, wherein the fourth pair of electrodes is attached to the outer circumference of the wall of the fluid channel at the further elastic segment.

8. The sensor system according to claim 1, wherein the processing unit is adapted to determine a flow rate of the fluid flow within the fluid channel based on a distance between the electrodes of the second pair of electrodes over time.

9. A use of the sensor system according to claim 1 for determining a flow rate of a fluid flow within a fluid channel, wherein a movement of the electrodes of the second pair of electrodes towards or away from each other represents a direct measure of a change in fluid pressure of the fluid flowing within the fluid channel, which change in fluid pressure can be calculated into a flow rate of the fluid flowing within the fluid channel.

10. A method for determining a flow rate of a fluid flow within a fluid channel by means of the sensor system of claim 1, the method comprising the steps of:
    detecting a capacitance of the first pair of electrodes,
    detecting a capacitance of the second pair of electrodes,
    calculating a distance between the electrodes of the second pair of electrodes based on the detected capacitance of the first pair of electrodes and the capacitance of the second pair of electrodes, and
    determining a flow rate of the fluid flow within the fluid channel based on a difference in distance between the electrodes of the second pair of electrodes over time.

11. The method according to claim 10, wherein the distance between the electrodes of the second pair of electrodes is calculated by means of the following equation $$d_{2nd} = (C_{1st} \times d_{1st} \times A_{2nd})/(A_{1st} \times C_{2nd}),$$

wherein
- $d_{1st}$=distance between the electrodes of the first pair of electrodes;
- $A_{1st}$=surface area of the electrodes of the first pair of electrodes;
- $d_{2nd}$=distance between the electrodes of the second pair of electrodes;
- $A_{2nd}$=surface area of the electrodes of the second pair of electrodes;
- $C_{1st}$=detected capacitance of the first pair of electrodes; and
- $C_{2nd}$=detected capacitance of the second pair of electrodes.

12. The method according to claim 10, wherein a difference in distance between the electrodes of the second pair of electrodes over time reflects a change of fluid pressure within the elastic segment of the fluid channel.

13. The method according to claim 10, wherein an elasticity of the elastic segment of the fluid channel is adjusted based on an expected flow rate within the fluid channel.

* * * * *